July 31, 1928.

L. L. KELLER 1,678,910

AGRICULTURAL IMPLEMENT

Filed April 13, 1927      2 Sheets-Sheet 1

Inventor

*Lee L. Keller*

By *Clarence A. O'Brien*
Attorney

July 31, 1928.

L. L. KELLER 1,678,910

AGRICULTURAL IMPLEMENT

Filed April 13, 1927      2 Sheets-Sheet 2

Inventor

Lee L. Keller

By Clarence A O'Brien
Attorney

Patented July 31, 1928.

1,678,910

UNITED STATES PATENT OFFICE.

LEE L. KELLER, OF WELLINGTON, COLORADO.

AGRICULTURAL IMPLEMENT.

Application filed April 13, 1927. Serial No. 183,484.

The present invention relates generally to agricultural implements and particularly to the digger or pulverizing type, such as are used.

An important object of the invention lies in the provision of a structure whereby the frame is mounted on wheels and the implements may be easily raised or lowered, and may be forced into engagement with the ground by spring means, on which the desired tension may be placed.

A still further important object of the invention lies in the provision of an apparatus of this nature, which is simple in its construction, strong and durable, easy to manipulate, thoroughly efficient and reliable in operation, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

Figure 1:
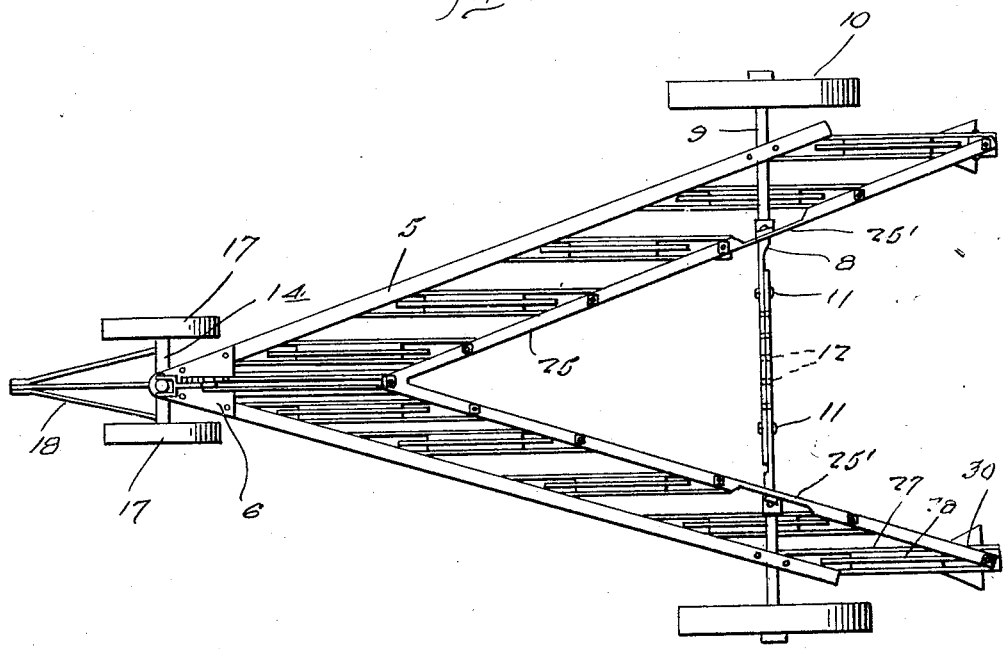
Figure 1 is a top plan view of the apparatus.
Figure 4:
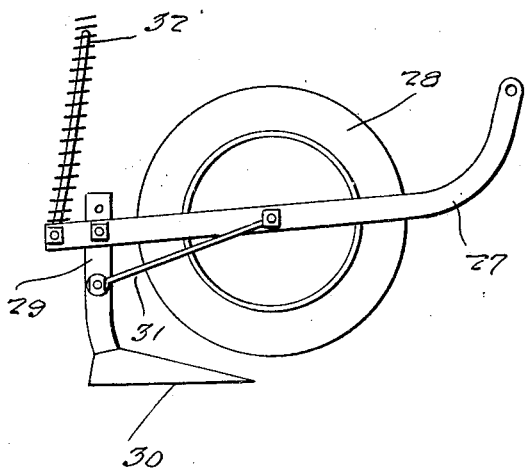
Figure 4 is a detail elevation of one of the implements.
Figure 5:
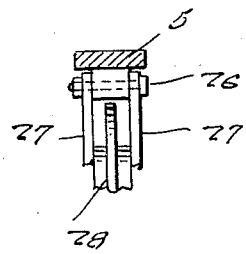
Figure 5 is an enlarged detail view through the frame showing the pivoted connection therewith, as the implement arm.

Referring to the drawing in detail, it will be seen that the numeral 5 denotes a V-shaped frame having a plate fixed at the apex thereof. Depending from adjacent the extremities of the frame 5 are bearings 7, for receiving shaft sections 8, the outer ends of which are offset downwardly as at 9, and on the extremities has journaled the rear wheels 10. The inner ends of the sections 8 are flattened, and held alongside of each other, by means of bolts 11. These flattened portions are provided with a plurality of apertures 12, so that the sections may be adjusted to lengthen or shorten the rear axle construction, so as to have the rear wheels the desired distance apart. The front axle is denoted by the numeral 14 and has rising from the center thereof a standard 15, which is journaled through plates 6. This standard 15 is also slidable vertically through these plates 6. Wheels 17 are journaled on the extremities of the front axle 14. Suitable draft means 18 is provided on the front wheel assembly. Brackets 19 support a notched quadrant 20, on which is pivoted a lever 21 having a suitable detent structure 22, engageable with the notches thereof. The lever 21 is provided with an extension 23 having a pin and slot connection 24 with the upper end of the standard 15. An auxiliary V-shaped frame 25 has pivoted thereto, as at 26, a plurality of arms 27, arranged in pairs. Between each pair of arms 27 there is journaled a disc 28. At the extremities of each pair of arms 27 there is fixed a shank 29, having a spade 30 on the bottom end thereof. These shanks 29 are braced with respect to the arms 27 as at 31. Links 32 are pivoted to the arms 27, and are extended through the frame 25, and have nuts 33 at their upper ends. Springs 34 are disposed about the links 32 and impinge against the arm 27 and against the frame 25. The sides of the V-shaped frame 25 have arcuate depending portions 25', which are pivoted as at 35, to arms 36 rotatable by means of terminal sleeves 37, on axle section 8. A link 38 is pivotally engaged as at 39 with the apex of the V-shaped frame 25. The link 38 is pivoted as at 40 to the lever 21.

Figure 2:
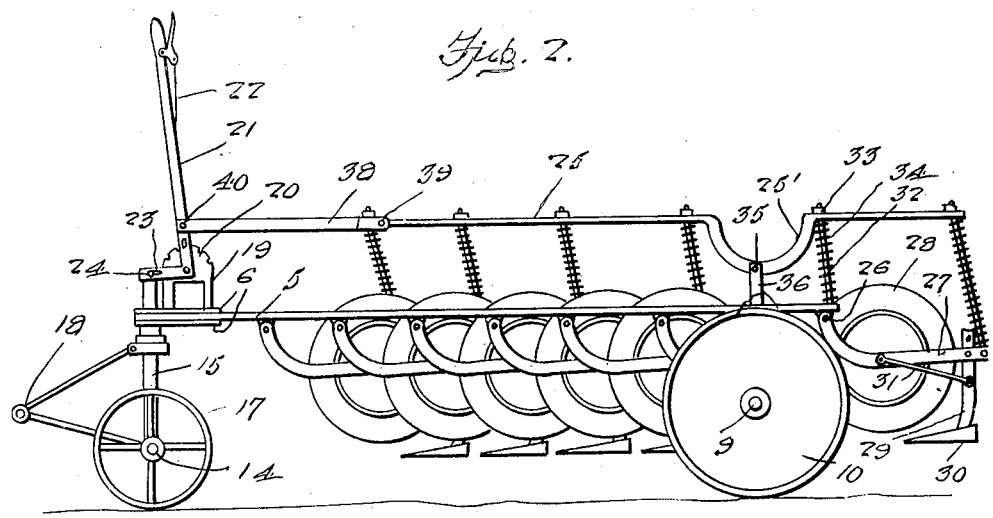
Figure 2 is a side elevation thereof.
Figure 3:
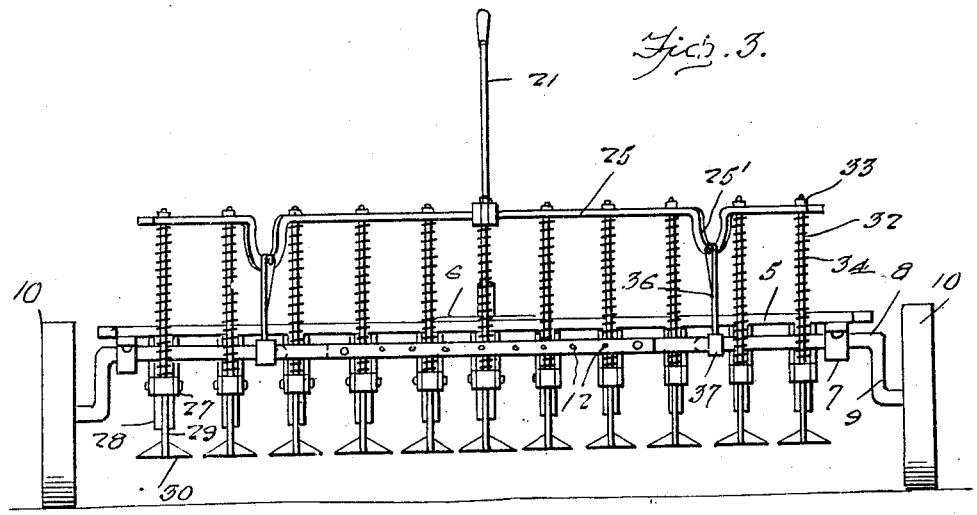
Figure 3 is a rear elevation thereof.

From the above detailed description, it will be seen that by rocking the lever 21 to the right in Figure 2, the implement, such as the disc 28 and 30 may be lowered into engagement with the ground, and tension may be disposed on the springs 34, for causing these implements to dig into the ground for weeding or like purposes. It will be noted that as the lever 31 is swung in the direction indicated, the main frame 5 at the forward end is tilted downwardly, because of the extension 23 and the pivot slot connection 24 with the standards 15. Obviously, the frame and the implement may be returned to the position shown in Figure 2, by merely swinging the lever 21 in the opposite direction.

It is thought that the operation, utility and advantages and operation of this invention will now be apparent to those skilled in this art, without a more detailed description thereof. The present embodiment of the invention has been disclosed in detail merely by way of example, since in actual practice, it attains the features of advantage enumerated as desirable in the statement of the invention and the above description.

It will be apparent that changes in the details of construction, in the combination and arrangement of parts may be resorted to, without departing from the spirit or scope of the invention as hereinafter claimed or sacrificing any of its advantages.

Having thus described my invention, what I claim as new is:

An apparatus of the class described, including a main V-shaped frame, a rear axle on the frame, wheels on the rear axle, a front axle, wheels on the front axle, a standard rising from the front axle through an opening in the apex of the main frame, a bracket, a lever mounted on the bracket, an arm extending from the lever, a pin and slot connection between the arm and the standard whereby the forward end of the main frame may be raised and lowered by swinging the lever, arms pivoted to the main frame, implements on the last mentioned arms, links connected to the last mentioned arms, an auxiliary V-shaped frame, arms swingably mounted on the rear axle and pivotally connected to the intermediate portions of the auxiliary V-shaped frame, and springs on the links between the frame and the second mentioned arm.

In testimony whereof I affix my signature.

LEE L. KELLER.